(12) United States Patent
Schmoll Genannt Eisenwerth et al.

(10) Patent No.: US 9,371,812 B2
(45) Date of Patent: Jun. 21, 2016

(54) ADAPTATION OF THE CLUTCH TORQUE OF A CLUTCH OF A PARALLEL-HYBRID DRIVE TRAIN OF A VEHICLE

(71) Applicant: Robert Bosch GmbH, Stuttgart (DE)

(72) Inventors: Kaspar Schmoll Genannt Eisenwerth, Vaihingen-Horrheim (DE); Manuel Schnitzer, Altenriet (DE); Fabio Iacona, Gava (ES); Mykhaylo Klymenko, Gerlingen (DE)

(73) Assignee: Robert Bosch GmbH, Stuttgart (DE)

( * ) Notice: Subject to any disclaimer, the term of this patent is extended or adjusted under 35 U.S.C. 154(b) by 179 days.

(21) Appl. No.: 14/366,364

(22) PCT Filed: Oct. 24, 2012

(86) PCT No.: PCT/EP2012/071003
§ 371 (c)(1),
(2) Date: Jun. 18, 2014

(87) PCT Pub. No.: WO2013/091947
PCT Pub. Date: Jun. 27, 2013

(65) Prior Publication Data
US 2015/0005136 A1 Jan. 1, 2015

(30) Foreign Application Priority Data

Dec. 22, 2011 (DE) .......................... 10 2011 089 676

(51) Int. Cl.
*B60W 10/02* (2006.01)
*F02N 11/08* (2006.01)
(Continued)

(52) U.S. Cl.
CPC ............... *F02N 11/08* (2013.01); *B60W 10/02* (2013.01); *B60W 10/06* (2013.01); *B60W 10/08* (2013.01); *B60W 20/00* (2013.01); *F16D 48/06* (2013.01); *B60W 2050/0087* (2013.01); *B60W 2510/082* (2013.01); *F16D 2500/1066* (2013.01); *F16D 2500/10412* (2013.01); *F16D 2500/3056* (2013.01); *F16D 2500/3067* (2013.01); *F16D 2500/30401* (2013.01); *F16D 2500/3108* (2013.01); *F16D 2500/5043* (2013.01);
(Continued)

(58) Field of Classification Search
None
See application file for complete search history.

(56) References Cited

U.S. PATENT DOCUMENTS

2009/0255743 A1   10/2009   Dilzer et al.
2011/0277533 A1*  11/2011   Mitchell ............. G01M 13/022
                                                            73/1.73
(Continued)

FOREIGN PATENT DOCUMENTS

| CN | 101205821 | 6/2008 |
| DE | 10260435 | 7/2004 |
| WO | 2008064633 | 6/2008 |
| WO | 2011134451 | 11/2011 |

OTHER PUBLICATIONS

International Search Report for Application No. PCT/EP2012/071003 dated Jan. 7, 2013 (English Translation, 2 pages).

*Primary Examiner* — Justin Holmes
(74) *Attorney, Agent, or Firm* — Michael Best & Friedrich LLP

(57) ABSTRACT

The invention relates to a method for permitting adaptation of the clutch torque of a proportional clutch in parallel hybrid vehicles, wherein given certain peripheral conditions the method is triggered automatically by a control device and the internal combustion engine rotates but is not ignited (phantom start).

7 Claims, 3 Drawing Sheets

(51) Int. Cl.
*B60W 20/00* (2016.01)
*F16D 48/06* (2006.01)
*B60W 10/08* (2006.01)
*B60W 10/06* (2006.01)
*B60W 50/00* (2006.01)

(52) U.S. Cl.
CPC . *F16D2500/5122* (2013.01); *F16D 2500/7041* (2013.01); *F16D 2500/70605* (2013.01); *F16H 2342/00* (2013.01); *Y10T 477/75* (2015.01)

(56) References Cited

U.S. PATENT DOCUMENTS

2011/0295455 A1  12/2011  Schenk
2011/0301791 A1\*  12/2011  Swales ................... B60K 6/485
                                                                                          701/22

\* cited by examiner

ADAPTATION OF THE CLUTCH TORQUE OF A CLUTCH OF A PARALLEL-HYBRID DRIVE TRAIN OF A VEHICLE

BACKGROUND OF THE INVENTION

In parallel-hybrid systems (for example VW Touareg Hybrid, Porsche Cayenne S Hybrid, Nissan Fuga Hybrid), the internal combustion engine (VM) and the electric machine (EM) are located on one driveshaft (see FIG. 1). In order to be able to drive purely electrically, the internal combustion engine is usually separated from the rest of the drive by a proportional clutch (K0). As a result, only with the aid of the electric machine is it possible to generate propulsion and avoid the drag torques of the internal combustion engine and mass throughput in the exhaust gas post-treatment system.

Clutches can be differentiated on the basis of their design into a pulse and a proportional clutch. Pulse clutches only have the states of open (no torque) and closed (full torque). In contrast, proportional clutches are capable of setting any torque of the clutch characteristic curve between the states of open and closed. They can be used, in particular, in "slip-sensitive" drive trains. Drive trains with a converter are, for example, "slip-sensitive" since the change in the difference in the rotational speed between the electric machine and the transmission input (converter slip) results in an effect on the torque at the wheel.

In order to be able to switch on the internal combustion engine again when necessary during the electric travel without using an additional starting unit (for example pinion starter), the internal combustion engine is started using the clutch. In order to be able to allow for the applicable comfort requirements in a "slip-sensitive" drive train, it is necessary to know as precisely as possible the torque which is set across the clutch since said torque is compensated by means of the electric machine so that the rotational speed of the electric machine and therefore the slip as far as possible does not change in the case of starting.

The prior art comprises carrying out, in a number of starting phases while fulfilling specific peripheral conditions, the balancing of the angular momentum, already described in laid-open patent application DE 10 2008 042 685 A1, of the involved drive train components in order to adapt the clutch torque. In highly simplified terms, during this balancing the expected change in rotational speed at the electric machine is compared with the actual change in rotational speed in the case of starting. If a deviation occurs, the clutch torque of the clutch which is actually transmitted is considered to be a cause of this deviation and is corrected (adapted) in accordance with this deviation.

The adaptation frequency per start is approximately 30% of the starts in the current hybrid series projects (PL72h). On average, approximately four starts occur per kilometer. The more precise the knowledge about the clutch characteristic curve (clutch torque plotted against actuator travel), the more comfortably the restarts can take place. It is therefore necessary to be able to carry out the adaptations as far as possible without restriction and if necessary.

SUMMARY OF THE INVENTION

As a result of the trend toward plug-in hybrid vehicles, that is to say vehicles with an enlarged battery capacity and the possibility of charging these batteries by network cable, the number of engine starts can be drastically reduced (<1 start/km), and therefore also the possibility of adapting the clutch characteristic curve by means of the known method. It is even possible that adaptation cannot take place over weeks if the driver utilizes the permissible electric driving range in an optimum way and charges the vehicle battery exclusively at the socket. Nevertheless, it is necessary to ensure that the engine start meets the comfort requirements even after long phases of purely electric travel.

By virtue of the method according to the invention it is possible to apply the proven balancing of angular momentum without the internal combustion engine being started, with the result that this is not noticed by the vehicle occupants.

In the past, for successful adaptation it was necessary to wait for the superordinate control (operating strategy) to trigger a start on the basis of the present travel situation and for the peripheral conditions in this case of starting also to be suitable for adaptation. The new plug-in travel profile makes it necessary to actively trigger and coordinate this adaptation.

The advantage of the invention described here is the fact that a possibility is provided of carrying out the proven balancing of angular momentum in such a way that, on the one hand, a classic engine start with injection, ignition and synchronization of the rotational speed of the internal combustion engine and of the electric machine does not have to take place and, on the other hand, this process occurs unnoticed by the driver. This operating state is referred to below as a "fake start" since the internal combustion engine is not actually started (for example there is no injection and/or ignition). The real internal combustion engine start is referred to here as a "restart".

Further advantages are that, on the one hand, the clutch controller observes the travel state and in that a fake start can be triggered by the clutch controller under adaptation-friendly peripheral conditions as soon as the adaptation request is present in the clutch controller, which significantly improves the adaptation frequency per start. On the other hand, in the case of the contemporary adaptation method, the adaptation time period (number of roughness points for calculating the balancing) is very small owing to the necessary dynamic requirements when performing a restart by means of the superordinate controller, i.e. the driver expresses his torque request by means of the accelerator pedal and wishes to or should primarily experience a direct reaction thereto. Only secondarily is adaptation carried out, or not at all. The greater the deceleration, the more "unsporty" the product is perceived as being. This is no longer the case with the method described here including the fake start since the start is not triggered by the driver's request but rather by the clutch control functionality.

The fake start is ended again actively by the clutch control functionality if there is a sufficient number of calculation reference points available for the adaptation, the adaptation request by a strategy-conditioned engine start is ended or the peripheral conditions which are valid for the adaptation are infringed. The previous adaptation during the restart can occur as before and the fake starting method forms a functional branch which is parallel thereto.

In general, a method for adapting the clutch torque of a proportional clutch which is arranged between an internal combustion engine and an electric machine in a drive train of a parallel-hybrid vehicle has, according to a first aspect of the invention, the following steps: checking whether the proportional clutch is open, whether the internal combustion engine is off and whether the electric machine is active, at least partially closing the proportional clutch, starting the internal combustion engine, and adapting the clutch torque of the proportional clutch. In this method, fuel is not injected into the internal combustion engine, with the result that the internal combustion engine is not fired.

According to one embodiment of the invention, the adaptation of the clutch torque of the proportional clutch comprises comparing an expected change in the rotational speed of the electric machine with an actually occurring change in the rotational speed.

In addition to the conditions that the proportional clutch is open, the internal combustion engine is off and the electric machine is active, according to one embodiment of the invention it is also possible to check at least one of the following conditions, specifically whether the transmission state is satisfactory, whether the vehicle speed is within predefined limits, whether a sufficient torque reserve of the electric machine is available, whether a driver's request is within specific limits and whether the driver's request is stable, whether a time condition is met (for example debouncing, time since last adaptation), whether a temperature condition is met (for example of the transmission oil), whether the rotational speeds of the internal combustion engine and the electric machine are within predefined values.

According to a further embodiment of the invention, the method can be aborted at any time. Since the adaptation of the clutch torque has a subordinate priority, a change in the checked conditions, in particular a change in the driver's request, can therefore lead to aborting of the method at any time.

In addition, the method according to the invention can comprise gating out optical and/or acoustic signals which permit a driver to monitor the states of, for example, the engine/motor during a normal operating state.

According to a further aspect of the invention, a parallel-hybrid drive train has an internal combustion engine, an electric machine, a proportional clutch which is arranged between the internal combustion engine and the electric machine, and a control unit for controlling the drive train. The control unit is configured to carry out the method according to the invention for adapting the clutch torque of the proportional clutch.

According to a further aspect of the invention, a computer program is made available which carries out all the steps of a method according to the invention when it runs on a control unit of a parallel-hybrid drive train as described above. A corresponding computer program is preferably loaded into a main memory of the control unit. The control unit or a data processor is therefore equipped to carry out the method according to the invention.

In addition, the invention also relates to a computer-readable medium such a CD-ROM in which the computer program can be stored. However, the computer program can also be made available via a network such as the Internet and can be downloaded into the main memory of the control unit from this network.

It is noted that embodiments of the invention are described with reference to different subject matters. However, a person skilled in the art will recognize from the above description and the following description, in addition to any combination of features which are associated with one type of subject matter, also any combination between features which are described with respect to different subject matters. This all counts as part of the overall disclosure of the application.

BRIEF DESCRIPTION OF THE DRAWINGS

Aspects and further aspects, features and advantages of the invention which are described above can also be found in the example of an embodiment which is described below with reference to the appended drawings. It is noted that the invention is not restricted to this embodiment.

DETAILED DESCRIPTION

Figure 1:
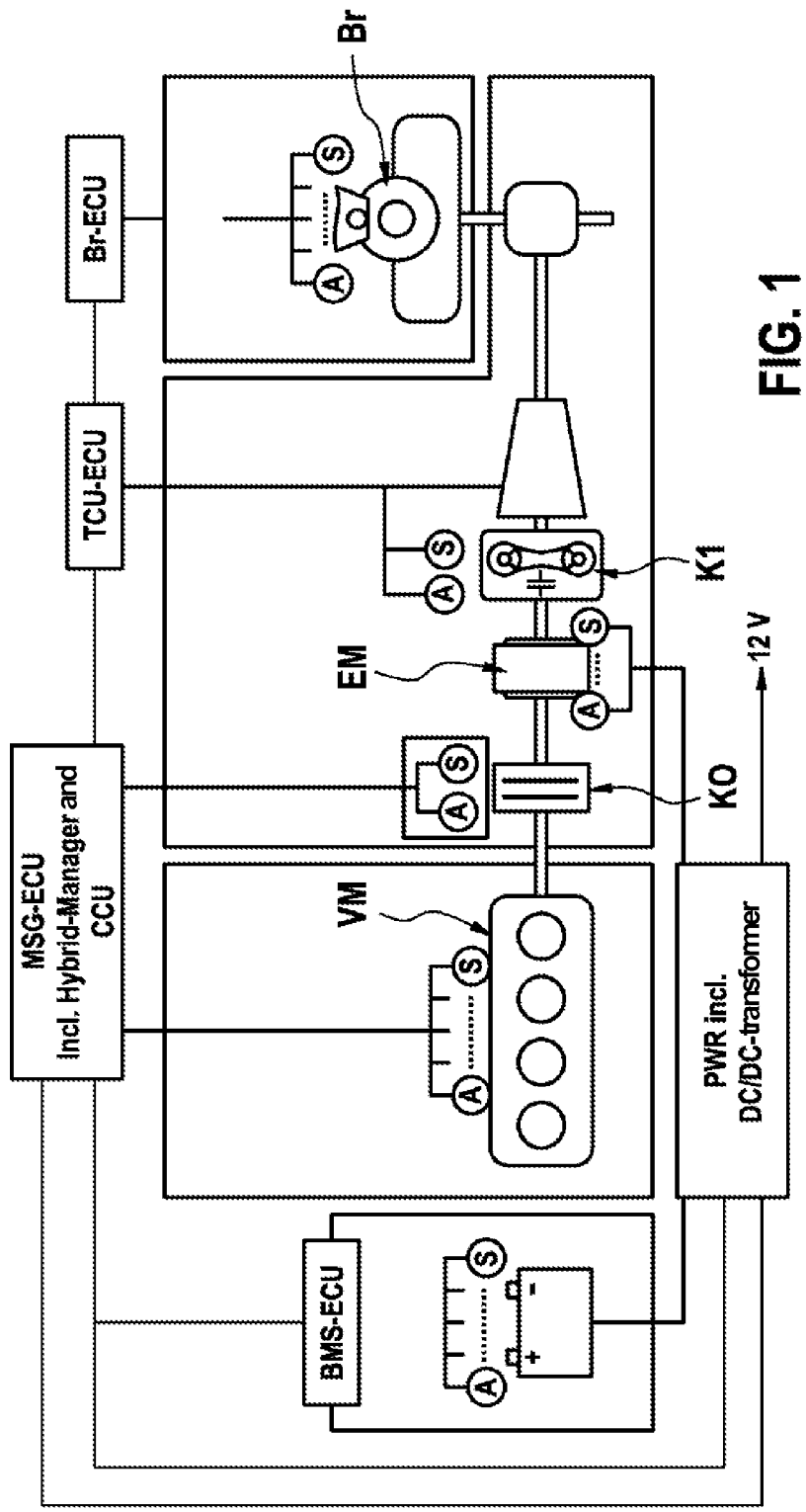
FIG. 1 shows a schematic illustration of a parallel-hybrid drive train according to the invention.

FIG. 1 shows a schematic illustration of a parallel-hybrid drive train of a vehicle. In FIG. 1, a clutch K0 is arranged between an internal combustion engine VM and an electric machine EM which can be used both as an electric motor and as a generator, wherein after the electric machine the drive train carries on to a driven axle of a vehicle.

The drive train can also have a series of actuators A and sensors S which can be used, on the one hand, to detect a current operating state of one of the elements of the drive train, such as, for example, the internal combustion engine, the clutch, the electric machine or the output clutch and, on the other hand, to change the operating state. The actuators and sensors are connected at least to a control unit ECU. The control unit of the drive train in FIG. 1 has, on the one hand, an engine control device MSG-ECU and, on the other hand, a transmission control device TCU-ECU. In addition, the control unit has a brake controller Br-ECU and a battery controller BMS-ECU. The individual control units are connected to one another via a bus system.

Figure 2:
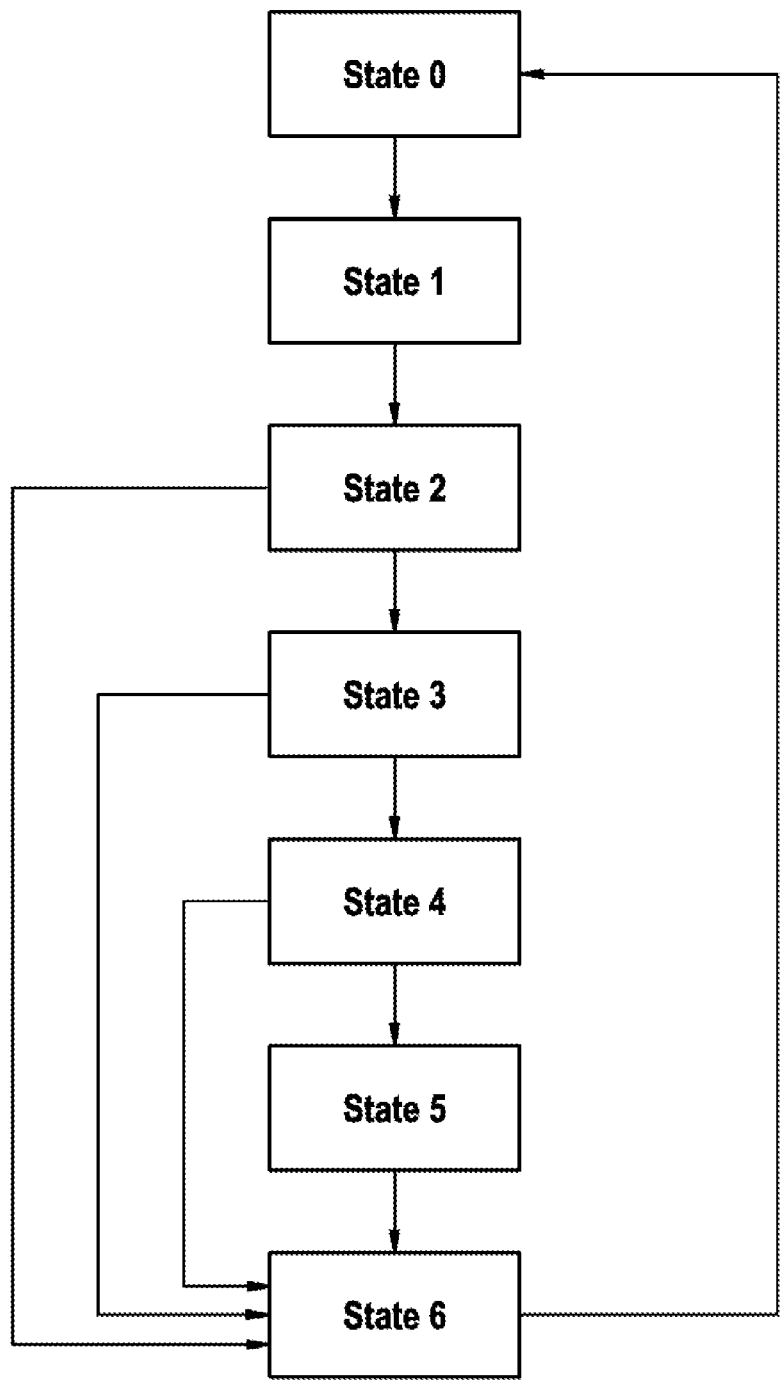
FIG. 2 shows a flowchart schematically illustrating a method according to the invention.

FIG. 2 shows a flowchart which indicates in principle the steps of a method according to the invention for controlling a parallel-hybrid drive train. It is noted that the described steps are main steps, wherein these main steps can be differentiated and divided into sub-steps. Furthermore, further sub-steps can be provided between the main steps. For this reason, a sub-step is mentioned only if this step is important for understanding the principle of the method according to the invention.

In State 0 (idle), an adaptation request is registered by the system in an initial state in which a vehicle is travelling electrically, i.e. the internal combustion engine is off, the clutch is open and the electric machine is active. The method according to the invention is therefore triggered.

In State 1 (enable conditions), all the desired peripheral conditions are checked. For example, the following peripheral conditions for a fake start can be evaluated:
Travel state "travel electrically"
Clutch state satisfactory
Transmission state satisfactory
Vehicle speed within limits
Sufficient torque reserve EM is present (in order to be able to compensate the K0 torque to 100%)
Driver's request within limits and stable
Time conditions (debouncing, time since last adaptation)
Temperature conditions (for example transmission oil)
Rotational speeds (VM, EM)

In State 2 (preconditions valid), it is detected whether the desired/necessary conditions are met.

In State 3 (fake start active), a fake start is triggered.

In State 4 (clutch active), the proportional clutch is set to a value with an expected transmission torque.

In State 5 (wait for success), an actual transmission torque is detected and an adaptation value is calculated on the basis of a comparison between the expected transmission torque and the actual transmission torque.

In State 6 (fake start end), the fake start is ended.

In FIG. 2, the arrows which connect State 2 directly to State 6, and State 3 directly to State 6 and State 4 directly to State 6 show that during the fake start and the associated adaptation of the clutch torque the method can be aborted at any time.

In addition, the arrow from State 6 to State 0 indicates that the method can be carried out repeatedly. The method can also be executed as an endless loop.

According to one embodiment, the software functionality has a coordinator which has the function of bundling and prioritizing clutch-control-internal requests (adaptation request during travel (by means of the fake state), closing request, adaptation request during the stationary state of the vehicle). In the case of a decision on an adaptation request, a fake start is requested from a superordinate control unit during the travel and while the peripheral conditions are valid.

Figure 3:
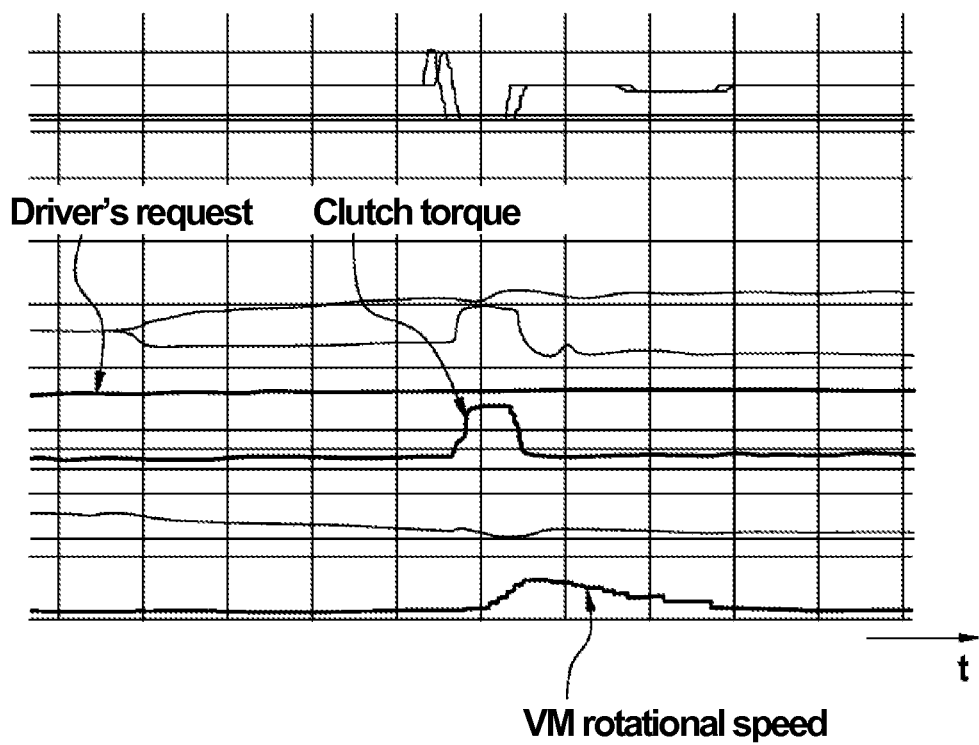
FIG. 3 shows a flowchart which clarifies the torques and rotational speeds of the elements of a parallel-hybrid drive train according to the invention over time.

FIG. 3 shows the time profile of a fake start, wherein the internal combustion engine VM turns for approximately 500-750 ms starting from a time at which the proportional clutch is at least partially closed and therefore a clutch torque is present. The injection is not carried out during the fake start. The constant line in FIG. 3, which represents the driver's request, clarifies that the fake start is triggered without an explicit driver's request.

It is noted that the rotational speed signal is gated out in the combination instrument during the fake start so that the driver cannot perceive the starting of the internal combustion engine visually. The starting generally cannot be perceived acoustically at approximately 500 rpm since rolling noises of the tires, ambient noises or the radio are significantly superimposed on the noises which occur as a result of the revving up of the internal combustion engine. In terms of application, by means of the peripheral conditions for fake starts it is possible to ensure that adaptation is carried out only in travel situations in which the process remains unnoticed acoustically and with respect to comfort.

Although the invention was illustrated and described in detail in the preceding description, such illustrations and descriptions are merely to be considered illustrative and exemplary and not restrictive. The invention is not limited to the disclosed embodiment. Other variations of the disclosed embodiment can be understood and brought about by a person skilled in the art when implementing the claimed invention on the basis of study of the drawings, of the disclosure and of the appended claims. In the claims, the word "have" does not exclude other elements or steps, and the indefinite article "a" does not exclude a plurality.

Simply the fact that individual features are mentioned in different dependent claims is not intended to mean that a combination of these features cannot be used advantageously. The reference symbols in the claims are not intended to limit the scope thereof.

The invention claimed is:

1. A method for adapting the clutch torque of a proportional clutch which is arranged between an internal combustion engine and an electric machine in a drive train of a parallel-hybrid vehicle, the method comprising:
    checking whether the proportional clutch is open, whether the internal combustion engine is off and whether the electric machine is active,
    closing the proportional clutch,
    starting the internal combustion engine,
    adapting the clutch torque of the proportional clutch, and
    preventing the injection of fuel into the internal combustion engine, with the result that the internal combustion engine is not fired.

2. The method as claimed in claim 1, wherein the adaptation of the clutch torque of the proportional clutch comprises comparing an expected change in the rotational speed of the electric machine with an actually occurring change in the rotational speed.

3. The method as claimed in claim 1, further comprising checking at least one of the conditions selected from the group including transmission state, vehicle speed, torque reserve of the electric machine, driver's request, time, temperature, and rotational speed.

4. The method as claimed in claim 1, further comprising aborting adaptation of the clutch torque in response to checked conditions.

5. The method as claimed in claim 1, further comprising:
    gating out optical signals, acoustic signals, or both optical and acoustic signals which permit driving states to be monitored by a driver.

6. A parallel-hybrid drive train comprising:
    an internal combustion engine,
    an electric machine,
    a proportional clutch arranged between the internal combustion engine and the electric machine, and
    a control unit for controlling the drive train,
    the control unit configured to
    check whether the proportional clutch is open, whether the internal combustion engine is off and whether the electric machine is active,
    close the proportional clutch,
    start the internal combustion engine,
    adapt the clutch torque of the proportional clutch, and
    prevent the injection of fuel into the internal combustion engine.

7. A computer program stored on a non-transitory computer readable medium and configured, when executed on a control unit of a parallel-hybrid drive train to
    check whether a proportional clutch is open, whether an internal combustion engine is off and whether an electric machine is active,
    close the proportional clutch,
    start the internal combustion engine,
    adapt a clutch torque of the proportional clutch, and
    prevent the injection of fuel into the internal combustion engine.

* * * * *